US011764976B2

(12) United States Patent
Rivera et al.

(10) Patent No.: US 11,764,976 B2
(45) Date of Patent: Sep. 19, 2023

(54) SYSTEM AND METHOD FOR SECURE INTERNET COMMUNICATIONS

(71) Applicant: RiVidium, Inc., Vienna, VA (US)

(72) Inventors: Jose Manuel Rivera, Burke, VA (US); Michael Lasky, Silver Spring, MD (US); Andrew Bruce, Glen Rock, PA (US)

(73) Assignee: TripleCyber Corp., Vienna, VA (US)

(*) Notice: Subject to any disclaimer, the term of this patent is extended or adjusted under 35 U.S.C. 154(b) by 0 days.

(21) Appl. No.: 17/729,177

(22) Filed: Apr. 26, 2022

(65) Prior Publication Data

US 2022/0353092 A1    Nov. 3, 2022

Related U.S. Application Data

(60) Provisional application No. 63/181,297, filed on Apr. 29, 2021.

(51) Int. Cl.
| | | |
|---|---|---|
| *H04L 9/32* | (2006.01) | |
| *H04L 9/00* | (2022.01) | |
| *H04L 9/30* | (2006.01) | |

(52) U.S. Cl.
CPC .............. *H04L 9/3263* (2013.01); *H04L 9/30* (2013.01); *H04L 9/50* (2022.05)

(58) Field of Classification Search
None
See application file for complete search history.

(56) References Cited

U.S. PATENT DOCUMENTS

| | | |
|---|---|---|
| 9,419,951 B1 | 8/2016 | Felsher |
| 10,749,676 B2 | 8/2020 | Simons |
| 10,972,274 B2 | 4/2021 | Redpath |
| 10,972,475 B1 | 4/2021 | Zaki |
| 2006/0112280 A1* | 5/2006 | Cohen ..................... G06F 21/34 713/186 |

(Continued)

OTHER PUBLICATIONS

Zhaofeng, M. et al., 2019. Blockchain-enabled decentralized trust management and secure usage control of IoT big data. IEEE Internet of Things Journal, 7(5), pp. 4000-4015. (Year: 2019).*

(Continued)

*Primary Examiner* — Luu T Pham
*Assistant Examiner* — Edward X Long
(74) *Attorney, Agent, or Firm* — Clyde Findley

(57) ABSTRACT

This invention is directed toward a communications server that enables individual actors on the Internet to be registered, their identities to be confirmed at an acceptable level of confidence, and their association with, and/or ownership of, certain user identifiers (such as email addresses, phone numbers, domain names, application usernames, and the like), to be verified. The invention also enables Internet actors communicate at different levels of security and to encrypt or sign digital messages and/or documents between each other while maintaining sole possession and control of their private cryptographic keys. To ensure the integrity of user information on the communications server has not been compromised, the invention includes embodiments to periodically backup crucial data in a publicly accessible blockchain format that cannot reasonably be altered, but can be independently verified.

1 Claim, 13 Drawing Sheets

(56) References Cited

U.S. PATENT DOCUMENTS

| | | | |
|---|---|---|---|
| 2006/0282528 A1* | 12/2006 | Madams | H04L 67/56 709/224 |
| 2009/0288150 A1* | 11/2009 | Toomim | G06F 21/6218 726/5 |
| 2017/0346851 A1 | 11/2017 | Drake | |
| 2018/0227293 A1* | 8/2018 | Uhr | G06F 21/64 |
| 2019/0158481 A1 | 5/2019 | Ronda | |
| 2020/0005290 A1 | 1/2020 | Madisetti | |
| 2020/0044823 A1* | 2/2020 | Savir | G06Q 20/401 |
| 2020/0073657 A1* | 3/2020 | Robison | H04L 9/0637 |
| 2020/0136803 A1* | 4/2020 | Prasad | H04L 9/0643 |
| 2020/0334771 A1 | 10/2020 | Li | |
| 2021/0342850 A1* | 11/2021 | Kumar | G06Q 20/3821 |

OTHER PUBLICATIONS

Antonopoulos, P., et al., 2021, June. SQL ledger: Cryptographically verifiable data in azure SQL database. In Proceedings of the 2021 international conference on management of data (pp. 2437-2449). (Year: 2021).*
PCT Search Report, PCT/US 22/26665, dated Aug. 26, 2022.
PCT Written Opinion, PCT/US 22/26665, dated Aug. 26, 2022.

* cited by examiner

SYSTEM AND METHOD FOR SECURE INTERNET COMMUNICATIONS

CROSS-REFERENCE TO RELATED APPLICATIONS

This application claims priority under 35 U.S.C. § 119(e) to U.S. Provisional Patent Application No. 63/181,297, entitled "Method and System for Securing the Internet," filed Apr. 29, 2021, the contents of which are incorporated by reference.

FIELD OF THE INVENTION

Embodiments of the present invention relate to an improved system and method of communicating on the Internet, where the identities of participants can be confirmed reliably, and where communications between participants can be secure. More particularly, embodiments of the present invention provide a new, more efficient, and more reliable computing and communications architecture for reliably registering Internet actors and confirming their identities, and for facilitating and managing secure Internet and network communications between those actors. Even more particularly, embodiments of the present invention provide a communications server and related software for registering and confirming the identities of individual actors on the Internet, and for facilitating communications between those individual actors at different levels of security and at different levels of identity confirmation. In addition, embodiments of the present invention also provide new user-device systems and methods that work together with a networked communications server to facilitate the creation, management, and use of public and private cryptographic keys to more efficiently enable secure Internet and network communications. Finally, embodiments of the present invention provide a secure method for recording user-level identifiers and their corresponding public keys on a publicly accessible, immutable cryptographic chain that can be used to verify the content and integrity of certain user-related information maintained on the communications server.

BACKGROUND

For all its eloquence and overall impact it has had on our lives, the current version of the Internet (circa 2021) has serious security flaws. Initially, these flaws were not viewed as flaws at all, because the Internet was intended to provide a mechanism for sharing information between disparate computing systems owned by entities that knew and cooperated with each other. It was conceived with the idea that collaboration was the primary goal, not security. Indeed, security was not a core feature of the Internet; it has always been an afterthought. Because of this, people have been trying to patch the Internet's endemically embedded security flaws, almost since the beginning.

One key security flaw, which enables bad actors to thrive on the Internet, is the ability to hide one's identity. It is almost trivial for anyone on the Internet to create a fake persona, including one that enables a user to masquerade as another person, a network, or even a fictitious entity. While there may be situations where anonymity has advantages, there is no reason why anyone using a computing network, a cellular phone, or an email account should be required to accept communications from anonymous sources. Similarly, there is no reason why anyone should be required to accept communications from sources masquerading as others. And conversely, there are many times when someone might want to verifiably assert who they are.

With the proliferation of Internet domains, 4G-5G networks, and small devices capable of communicating on the Internet (i.e., the Internet of Things, or "IoT" devices), the importance of Internet security has risen dramatically.

In normal society outside the Internet, people have a semblance of protection based on what we want to share and how we want to share it. We can go into a restaurant, a store, or a theatre, and the information we share with the public can be selected and/or controlled, depending on the level of trust we have in the other party. We can share almost no information, paying with cash, for example, or we can share certain private information by paying with a credit card or other electronic means. We may be willing to share additional private information with a well-known and/or trusted party, while we may not be so willing to do so with someone who is not so well-known or trusted. Examples of trusted parties may include a bank, a Department of Motor Vehicles, or the Internal Revenue Service. An example of an untrusted party might include a stranger trying to sell Rolex watches on a street corner.

On the Internet, a cybercriminal may falsely appear as a trusted party. Once a cybercriminal penetrates a person's computing system, it is often far too late to do anything about it. Valuable digital assets can be copied, deleted, or rendered useless in milliseconds.

Historically, attempts to secure communications on the Internet have had difficulties. Many have involved a degree of complexity with respect to configuration and use that placed them out-of-reach for most users. Some attempts have required more active management and out-of-band transmission of passwords that degrade security and ease of use. Many attempts have required the storage of private keys and/or secure documents on a centralized sever, where even though such documents are encrypted, there is nevertheless a suspicion that secrets might be exposed, either to the service provider or to a targeted attack. Given the importance of Internet security and the ease with which a malicious actor can masquerade as another identity, including a fake identity, and given the inadequacies in different solutions to this overall problem, there remains a need for an efficiently system and method for enabling individual actors on the Internet to register themselves, to securely prove their identities to a sufficiently high level of probability, and to communicate with other Internet actors at a selected security level.

SUMMARY OF THE INVENTION

This summary is provided to introduce certain concepts in a simplified form that are further described below in the Detailed Description. This summary is not intended to identify key features or essential features of the claimed subject matter, nor is it intended to limit in any way the scope of the claimed invention.

Embodiments of the present invention overcome the shortcomings of prior art attempts to secure the Internet by solving several related problems.

First, embodiments of the invention provide a communications server and appropriate software to enable individual actors on the Internet to be registered, their identities to be confirmed at an acceptable level of confidence, and their association with, and/or ownership of, certain user identifiers (such as email addresses, phone numbers, domain names, application usernames, and the like), to be verified. To provide these capabilities, embodiments of the communications server may include a database or digital ledger comprising user information, where, for each user identifier stored in the digital ledger/database associated with a verified user, the server can store a public key (the public portion of a public-private cryptographic key pair), which can be used by any other actor on the Internet to securely communicate with the user identifier's registered owner (the verified user) by encrypting a message to the user identifier using its public key. Similarly, a verified user may communicate securely with any other actor on the Internet by signing a message using their own locally stored private key (i.e., the private key is preferentially stored only on a user's device). When an encrypted message is received, the locally stored private key associated with the public key can be used to decrypt the message. When a signed message is received, the public key of the sending user, retrieved from the communications server, can be used to verify the signature on the message.

Embodiments of the invention may assign each public key to a specific security level or purpose associated with a given user identifier, to enable the security of certain communications to be customized or tailored to specific applications and needs.

Embodiments of the invention may implement the communications server as a cloud-based server or a SAAS (software as a service) system, either of which may include software and digital ledger(s) and/or database(s) residing and/or executing on a plurality of Internet-accessible computing platforms.

Second, to increase the security of cryptographic communications, embodiments of the present invention will preferentially not store private keys on the communications server. Instead, embodiments of the invention may generate private keys, together with their paired public keys, using a public-private key manager executing solely on a user device. Preferably, embodiments will store the locally generated private keys in a secure storage area on the user device in a manner that protects the private keys from access by unauthorized software. According to embodiments, only the public key associated with any given public-private key pair will be transmitted to and stored on the communications server.

Typically, embodiments of the present invention will generate each public-private key pair for a specific purpose or security level. For example, an embodiment may generate a public-private key pair for the purpose of encrypting and decrypting email communications at a specified security level, or for signing and verifying signatures of email communications. This purpose or role, as well as other purposes or roles, will be discussed in greater detail below in the Detailed Description portion of this application.

When a transmitting, but unverified, actor on the Internet wishes to send a secure message to a verified actor whose user identifier and public key have been stored on the communications server, the transmitting actor may invoke embodiments of the present invention to obtain the appropriate public key from the communications server (i.e., the public key associated with the target user identifier of the verified actor), use that public key to encrypt the message, and send the encrypted message directly to the target user identifier of the verified actor. When the verified actor receives the encrypted message, she may decrypt it using her corresponding private key.

Similarly, when a verified actor wishes to cryptographically sign a message that will be sent to a receiving actor (whether or not the identity of the receiving actor has been verified by the communications server), the transmitting verified actor need only sign the message with her private key, and then send the message to the receiving actor directly. When the receiving actor receives the signed message, the receiving actor may then interact with an embodiment of the communications server to obtain the appropriate public key associated with the transmitting verified actor's user identifier, and use the obtained public key to verify that the signature was created by the transmitting verified actor. The receiving actor may also obtain information about the transmitting verified actor from the communications server, in order to confirm that the transmitting verified actor is who he says he is.

Third, to ensure that the integrity of the information on the communications server has not been compromised, embodiments of the communications server may periodically create a backup of crucial public data—for example, user identifiers and their associated public keys—and save such backups in a format that cannot reasonably be altered. For example, an embodiment of the present invention may create a backup comprising a cryptographic chain of a plurality of chained records obtained from the digital ledger, where each chained record includes a hash or hashes of the user identifier of a verified actor and the public key associated with that user identifier. An embodiment of the invention may then escrow a copy of this cryptographic chain to a publicly available, immutable, append-only Internet blob, the contents of which can be cross-referenced with and validated against corresponding data residing in the digital ledger on the communications server.

Using the above-summarized solutions, embodiments of the present invention may ensure that digital messages can be sent and received securely via the Internet and other networks to and from actors and devices whose identities have been verified, thereby significantly reducing the probability of malicious actions. Fictitious and/or malicious actors may still exist on the Internet; but their existence will be obvious because their identity will not have been verified, for example, by an embodiment of the present invention. Embodiments of the present invention may thereby ensure that if an Internet actor wishes to communicate through an unverified persona, it can, while simultaneously ensuring that when the actor wants to communicate in a secure manner as a verified identity, it can do that as well.

The above summaries of embodiments of the present invention have been provided to introduce certain concepts that are further described below in the Detailed Description. The summarized embodiments are not necessarily representative of the claimed subject matter, nor do they span the scope of features described in more detail below. They simply serve as an introduction to the subject matter of the various inventions.

BRIEF DESCRIPTION OF THE DRAWINGS

So that the above recited features of the present invention can be understood in detail, a more particular description of the invention may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DESCRIPTION OF THE EMBODIMENTS

Figure 1:
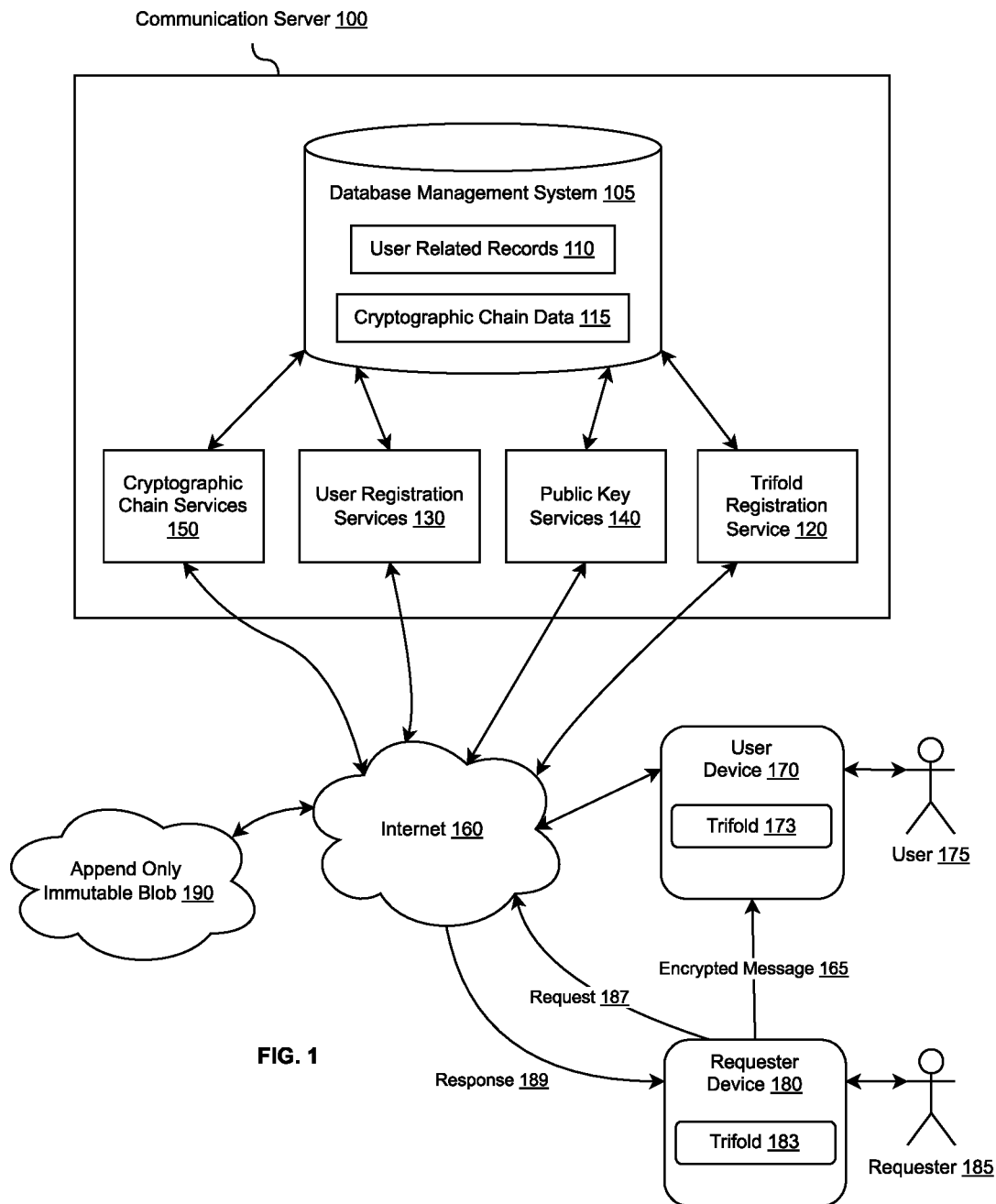
FIG. 1 is a block diagram illustrating an exemplary embodiment of a communications server for enabling secure Internet communications, in accordance with the present invention.

Embodiments of the present invention will be described with reference to the accompanying drawings, wherein like parts are designated by like reference numerals throughout, and wherein the leftmost digit of each reference number refers to the drawing number of the figure in which the referenced part first appears. Embodiments of the invention are not limited in their application to the details of construction or to the arrangement of the components set forth in the following description or illustrated in the drawings. Embodiments of the invention are capable of being practiced and carried out in various ways. In addition, the phraseology and terminology employed herein are for the purpose of description and should not be regarded as limiting.

Communications Server

FIG. 1 is a block diagram illustrating an exemplary embodiment of a Communications Server 100 for enabling secure Internet communications, in accordance with the present invention. Communications Server 100 is a logical construct that may be implemented in a number of physical configurations known to one skilled in the art, but each configuration will comprise the equivalent of an Internet-accessible computing server, similar to a web server with a database management system. Communications Server 100 may provide certain capabilities and functions that together enable users to communicate with a high degree of confidence concerning the identity of other users. To provide its capabilities and functions, embodiments of the Communications Server 100 may include a Database Management System 105, a Trifold Registration Service 120, a User Registration Services Module 130, a Public Key Services Module 140, and a Cryptographic Chain Services Module 150.

The term "Trifold," as used herein, refers to a software module installed on a user's device. A Trifold, such as Trifold 173 and/or Trifold 183, may perform public-private key creation and management functions, as well as cryptographic functions (such as encrypting a message or signing a message), on behalf of requesting applications. A Trifold may communicate with the Communications Server 100, may create public-private key pairs, may provide access to previously created public and private keys, and may perform other related tasks that will be discussed in more detail below. Trifold Registration Service 120 may interact with Trifolds (e.g., Trifold 173 and/or Trifold 183) residing on user devices.

Continuing to refer to FIG. 1, Database Management System 105 may include tables of User Related Records 110, where each such user-related record may contain information relating to a single user, and may also store (a) public keys for use in cryptographic communications with a registered, (b) information about computing devices registered to a user, and (c) information about applications that may reside and execute on a user's computing device, which may be registered to a user. An application may be referred to herein as an "asset."

Database Management System 105 may interact with the User Registration Services Module 130 to store and retrieve information about registered users. The User Registration Services Module 130 may perform these functions by providing a set of in-code data entities (e.g., structures, objects, etc.) for user data that are conformable with corresponding data stored in the Database Management System 105. The User Registration Services Module 130 may use industry standard database libraries (e.g., Microsoft's entity framework) to provide a connection between these in-code entities and the data stored in Database Management System 105. Data from Database Management System 105 may be fetched into the data entities maintained by User Registration Services Module 130, manipulated there, and then saved back to the Database Management System 105 using the provided capabilities of the library. For example, the User Registration Services Module 130 may use Microsoft's Entity Framework and LINQ libraries to move data between SQL Server database tables and C# objects that conform to these tables.

Database Management System 105 may interact with the Public Key Services Module 140 to provide public keys to other users (for example, to Requester 185) upon request.

The Public Key Services Module 140 may perform these functions by providing a set of in-code data entities (e.g., structures, objects, etc.) for key data that are conformable with corresponding data stored in Database Management System 105. Public Key Services Module 140 may use industry standard database libraries (e.g., Microsoft's entity framework) to provide a connection between these in-code entities and the data stored in Database Management System 105. Data from Database Management System 105 may be fetched into the data entities maintained by Public Key Services Module 140, manipulated there, and then saved back to the Database Management System 105 using the provided capabilities of the library. For example, Public Key Services Module 140 may use Microsoft's Entity Framework and LINQ libraries to move data between SQL Server database tables and C # objects that conform to these tables. Public Key Services Module 140 may provide a well-defined API through which an external software process (i.e., another program, such as a Trifold 173) can submit key data for storage to Database Management System 105, or another program (such as a Trifold 183) can submit a request (such as Request 187) for a particular key corresponding to a particular user registered in Database Management System 105. (A response to that request, for example Response 189, may provide the requested key.) For example, Public Key Services Module 140 might implement a restful web service interface that accepts query parameters in a Get query and returns data in JSON format.

Database Management System 105 may interact with the Cryptographic Chain Services Module 150 to create Cryptographic Chain Data 115 and to store a backup of Cryptographic Chain Data 115 to a remote, Append-Only, Immutable Blob 190 via the Internet 160. Cryptographic Chain Services Module 150 may include in the backup of Cryptographic Chain Data 115 a backup of certain data stored in User Related Records 110.

The Cryptographic Chain Services Module 150 may perform these functions by providing a set of in-code data entities (e.g., structures, objects, etc.) that represent the cryptographic chain of hashes commonly used to create an immutable record. Such chains are generally referred to block chains and are well understood by those skilled in the art. The data structures for these chains are conformable to the data stored in Database Management System 105. The Cryptographic Chain Services Module 150 may use industry standard database libraries (e.g., Microsoft's entity framework) to provide a connection between these in-code entities and the data stored in Database Management System 105. Data from Database Management System 105 may be fetched into the data entities, manipulated there, and then written back to the Database Management System 105 using the provided capabilities of the library. For example, the Cryptographic Chain Services Module 150 may use Microsoft's Entity Framework and LINQ libraries to move data between SQL Server database tables and C #objects that conform to those tables. The Cryptographic Chain Services Module 150 may use industry standard cryptographic libraries to compute the desired hashes of the Public Key and owning User Identifier data that are tracked and to add them to then end of Cryptographic Chain Data 115 for saving in the Database Management System 105. For example, the system may use cryptographic libraries that are part of Microsoft's .NetCore Framework.

The Cryptographic Chain Services Module 150 may escrow Cryptographic Chain Data 115, certain hashed data retrieved from User Related Records 110, and the constructed hash chains to a remote data storage location that is established as an Append Only Immutable Blob 190, which is not subject to subsequent manipulation by the Communication Server 100 or any software therein. That is, Append Only Immutable Blob 190 is a storage medium maintained by a third party that provides a medium that permits writing, but does not allow updating. For example Append Only Immutable Blob 190 may correspond to a Blob offered on the Azure cloud. The Cryptographic Chain Data 115 and certain hashed data retrieved from User Related Records 110 may be written to Append Only Immutable Blob 190 using the functions within an API provided by the third-party provider of Append Only Immutable Blob 190 storage. For example the system may use the Azure.Storage.Blobs library provided by Microsoft to write data to Azure Immutable Blobs.

Database Management System 105 may interact with the Trifold Registration Service 120 to store (a) information related to a user's Trifold (such as Trifold 173 or Trifold 183), (b) information about the user's devices where a Trifold resides (such as User Device 170 or Requester Device 180), and/or (c) information about various software applications running on a user's device (such as User Device 170 or Requester Device 180) that may be interacting with a Trifold. The Trifold Registration Service 120 may perform these functions by providing a set of in-code data entities (e.g., structures, objects, etc.) corresponding to devices, applications, and Trifold client certificates that are conformable with corresponding data stored in Database Management System 105. The Trifold Registration Service 120 may use industry standard database libraries (e.g., Microsoft's Entity Framework) to provide a connection between these in-code entities and the data stored in Database Management System 105. Data (received from a remote Trifold such as Trifold 173 or Trifold 183) in these data entities may be written to the Database Management System 105 using the provided capabilities of a respective library. The Trifold Registration Service 120 may provide a well-defined API through which a remote Trifold (such as Trifold 173 or Trifold 183) can provide data. For example the Trifold Registration Service 120 may implement a restful web service interface that accepts submitted data as query parameters. A registering Trifold (e.g., Trifold 173) may provide to the Trifold Registration Service 120 the type of User Device 170 and the name of User Device 170, along with a serial number. A registering Trifold (e.g., Trifold 173) may also provide to the Trifold Registration Service 120 an application identifier that was issued to a corresponding application developer when a given application type was registered for interacting with a Trifold. In response, a Trifold (such as Trifold 173) may receive a TLS (transport layer security) certificate (generated using standard cryptographic libraries) that is tied explicitly to a specific Trifold for a specific registered user (e.g., User 175), for a specific device (e.g., User Device 170), and for a specific application (not shown), to secure all future interactions with the Communication Server 100.

User Registration Services Module 130 is a software module executing on the Communications Server 100 that may perform the following functions: (1) register new users (such as User 175); (2) verify the identity of users using a variety of methods described below; and (3) determine whether a user's identity is known with sufficient confidence to allow that user to communicate at one of several available security levels. User Registration Services Module 130 may communicate with registering users such as User 175 via User Device 170 via the Internet 160. The information received from the User 175 is related to the verification of their digital identifiers with their real-world identities. For example, a user's digital identifier may be an email address or a phone number. Real-world identity information may comprise a given and family name of the User 175 and may also include their physical (street, city, etc.) address. Depending on the desired confidence level for identity verification and whether the provided identity information can be programmatically matched with trusted outside sources (discussed in more detail later) a user's identity can be verified. At higher levels of security, additional name and address information may be provided by a user in the form of selection of names and addresses from automatically generated lists, electronic scans of trusted government documents (e.g., a driver's license) or Geo-Location coordinates to test for presence at a provided location. Additionally, a real-time video of a user may be provided to allow for image liveness testing.

Data is also obtained by the User Registration Service 130 from various external "Trusted" sources to assist in the validation of the provided user name and address. Commonly used industry providers of Address verification and phone ownership may be queried using an API provided by these vendors to assess the veracity of the provided name and address. CNAM databases from phone providers may be checked as well.

Public Key Services Module 140 is a software module executing on the Communications Server 100 that may perform the following functions: (1) receive requests for a public key for a specific user for a specific purpose (for example, receive a request from Requester 185 for a public key associated with User 175 for encrypting a message); (2) extract a public key from the Database Management System 105 for a given user (such as for User 175); and (3) transmit an extracted public key corresponding to a given user (such as User 175) to a requesting user (such as Requester 185). Public Key Services Module 140 provides a well-defined API through which external software process (i.e., another program such as Trifold 173) can request key data for one or more users for one or more uses. For example, Public Key Services Module 140 might implement a restful web service interface that accepts query parameters for a particular user and a particular key type as query parameters of a Get query and returns the requested public key as a Base64 encoded string in a standard JSON payload.

Cryptographic Chain Services Module 150 is a software module executing on the Communications Server 100 that may perform the following functions: (1) interact with the Database Management System 105 to assemble cryptographically linked chains of selected hashed Cryptographic Chain Data 115; and (2) escrow a copy of the cryptographically linked chains to a remote Append-Only Immutable Blob 190 on the Internet 160. Third parties will be able to validate the long term ownership of a public key to a particular user against the cryptographic chains in two ways, depending on their degree of interest. Most easily they can compare the value of a key they have received against the value in the cryptographic chains that are stored in Database Management System 105 and can be requested from Cryptographic Chain Services 150 API. The Cryptographic Chain Services 150 API may implement a web service that provides both the Cryptographic Chain Data 115 and the data from which it was generated (obtained from Database Management System 105) as a CSV file (for example). The exact specification of how hashes are constructed and chained are publicly available and well known by those skilled in the art. For example the Communication Server 100 may provide a web page where these details are displayed. This allows validation of the integrity of the Cryptographic Chain Data 115 and allows verification of the value and ownership of any key therein. With slightly more difficulty, a user could choose to perform the same validation by downloading the escrowed data from the third party provided immutable blobs (for example, the escrowed data in Append Only Immutable Blob 190). Third party providers are selected in part, on their ability to make this action easily available. For example, Azure immutable blobs may be used, which directly provide a CSV download in response to an HTTPS request to a specific endpoint. Finally a third party can compare the data available from Database Management System 105 against the data available from the escrowed storage (Append Only Immutable Blob 190) and check that they are identical. For example, if the both the download from Database Management System 105 and escrowed data from Append Only Immutable Blob 190 are provided in identical CSV format, then an identity comparison can easily be performed by any user using a spreadsheet.

A User 175 may interact with Communications Server 100 via a User Device 170 to communicate with the Communications Server 100 via the Internet 160. User 175 may first interact with Communications Server 100 via a User Device 170 to become a registered user. User Device 170 may be a typical computing device capable of interacting with Internet web pages and the like. User Device 170 may also be a smartphone or similar device. User device may have Trifold 173 installed during user registration, or the Trifold 173 may be obtained later.

Becoming a registered user is a multi-step process that will be described in more detail below. Once User 175 is registered, however, the Communications Server 100 will have verified the identity of User 175 at one of several different confidence levels (or security levels) using methods described in more detail below. Once the User 175 is registered at some security level, a Trifold 173 can be installed and registered for User 175 on User Device 170. Such registration may result in the Communications Server 100 issuing a TLS (transport layer security) client certificate for the Trifold 173 to use later for securing future communications. A TLS certificate is an industry standard format for packaging a private key along with other identity information (a subject name) in a password secured package. The public key of the TLS certificate may be maintained on the Communication Server 100 (and is tied to a particular Trifold on a device for an application, for a user). The TLS certificate itself (with an encrypted private key) may be transferred to the Trifold (such as Trifold 173) where it can be stored. The password for the TLS certificate (a secret) may be stored in a secure fashion for a user (such as User 175) on the user's device (such as User Device 170) by the Trifold (such as Trifold 173). Such registration may also authorize a Trifold 173 to generate public and private key pairs to facilitate communication between User 175 and other registered users, for example Requester 185.

If another user, such as Requester 185, wishes to send a message to User 175, Requester 185 may cause Trifold 183 on Requester Device 180 to send a secured (using a TLS client certificate) Request 187 via the Internet 160 to the Public Key Services Module 140 of Communications Server 100. Request 187 may be sent using any number of standard protocols known to those skilled in the art. For example, Request 187 may be sent using a restful HTTPS query. Request 187 may ask Communications Server 100 to provide a public key for sending encrypted messages to User 175. If User 175 and its Trifold 173 have been registered on Communications Server 100 such that an appropriate public key has been generated and stored in an appropriate User Record 110 of Database Management System 105 for User 175, then in response to Request 187, the Public Key Services Module 140 of Communications Server 100 may extract the requested public key from the appropriate User Record 110 and transmit it to Requester 185 via the Internet 160 to Trifold 183 on Requester Device 180. Using the public key provided in the Response 189 to Request 187, the Requester 185's Trifold 183 may send an Encrypted Message 165 to User 175. When the Encrypted Message 165 is received by User 175, User 175 may use Trifold 173 to decrypt Encrypted Message 165 using User 175's private key corresponding to the public key that was used to encrypt the Encrypted Message 165 sent by Requester 185.

Database Management System

Figure 2:
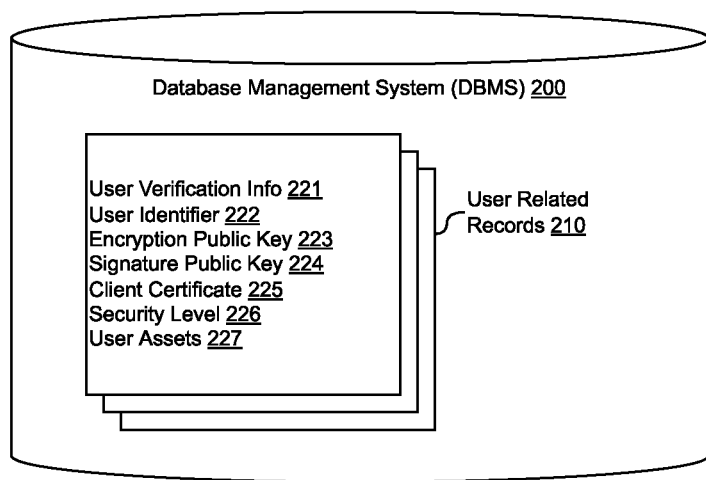
FIG. 2 is a block diagram illustrating an exemplary embodiment of a Database Management System (DBMS) component of a communications server for enabling secure Internet communications, in accordance with the present invention.

FIG. 2 is a block diagram illustrating an exemplary embodiment of a Database Management System (DBMS) 200 component of a Communications Server 100 for enabling secure Internet communications, in accordance with the present invention. DBMS 200 may be an instantiation of Database Management System 105 shown in FIG. 1.

Referring to FIG. 2, DBMS 200 may be modeled using any number of data models (e.g., relational, network, etc.) common to those skilled in the art. Similarly, any number of commonly available database management systems (e.g., SQL server, Oracle, Raima Database Manager) familiar to all practitioners could be used to instantiate the selected model. For consistent ease of presentation, without restricting the scope of the invention, DBMS 200 will be described using terminology and concepts (tables, records, fields, keys) based on the relational data model.

Within the DBMS 200 are User Related Records 210, which are records containing data that relate either directly or indirectly to individual users. User Related Records 210 may be an instantiation of User Related Records 110 shown in FIG. 1. As shown in FIG. 2, the data stored in User Related Records 210 may comprise the following tables and/or records: User Verification Info 221, User Identifier 222, Encryption Public Key 223, Signature Public Key 224, Client Certificate 225, Security Level 226, and User Assets 227.

User Verification Info 221 may contain information describing operational results of an identity verification process within the User Registration Services 300 shown in FIG. 3 and described in detail below. Still referring to FIG. 2, however, User Verification Info 221 may provide a record of the basis for which verification at a particular security level was granted. It may also provide information on the exact location of a user within a non-completed identity verification process.

User Identifier 222 may contain data used to identify a user. User Identifier 222 may include a globally unique user-name. It may also contain additional identifying user information such as an email address, a phone number, or a given name or family name.

Encryption Public Key 223 may contain data related to the public key of a remotely generated public/private key pair tied to a particular user. Encryption Public Key 223 may be stored in a format appropriate to the selected DBMS 200. It may contain additional information such as a thumbprint, a validity date range, and additional meta data. Encryption Public Key 223 should be of sufficient strength to be suitable for encryption of messages sent via the Internet. As a cryptographic best practice familiar to all those skilled in the art, Encryption Public Key 223 will preferentially be distinct from Signature Public Key 224.

Signature Public Key 224 may contain data related to the public key of a remotely generated public/private key pair tied to a particular user. Signature Public Key 224 may be stored in a format appropriate to the selected DBMS 200. It may contain additional information such as a thumbprint, a validity date range, and additional meta data. The encryption key strength of Signature Public Key 224 may be less than that of Encryption Public Key 223. As a cryptographic best practice familiar to all those skilled in the art, Signature Public Key 224 will preferentially be distinct from Encryption Public Key 223.

Client Certificate 225 may contain information about a public key for the TLS (Transport Layer Security) client certificate that was issued by Communications Server 100 to allow trusted communication to occur between Communications Server 100 and a user's Trifold, such as Trifold 173. Depending on exact implementation, Client Certificate 225 may contain additional data identifying the particular user device (e.g., User Device 170) and particular trifold (e.g., Trifold 173) to which it was issued. Client Certificate 225 may also contain expiration information allowing for easy invalidation in the event a user device (such as User Device 170) is compromised.

Security Level 226 may contain information about a derived or granted security level of the user (such as User 170) based on the findings of the user verification process described below. For example, Security Level 226 may correspond to a security level of "public," "private," "secure," or "enhanced." Security Level 226 may be referenced by software running on Communications Server 100 (for example, in Public Key Services Module 140) to grant or restrict certain requests made by User 175 or Requester 185, via software executing on User Device 170 or Requester Device 180, respectively.

User Assets 227 may contain information related to the assets registered to a user (such as User 170), or assets that interact with Communication Server 100 or are tracked for security verification. In this context, the term "assets" has a generic meaning that may include computing devices, software applications, Trifolds, Internet domains, and the like.

User Registration Service

Figure 3:
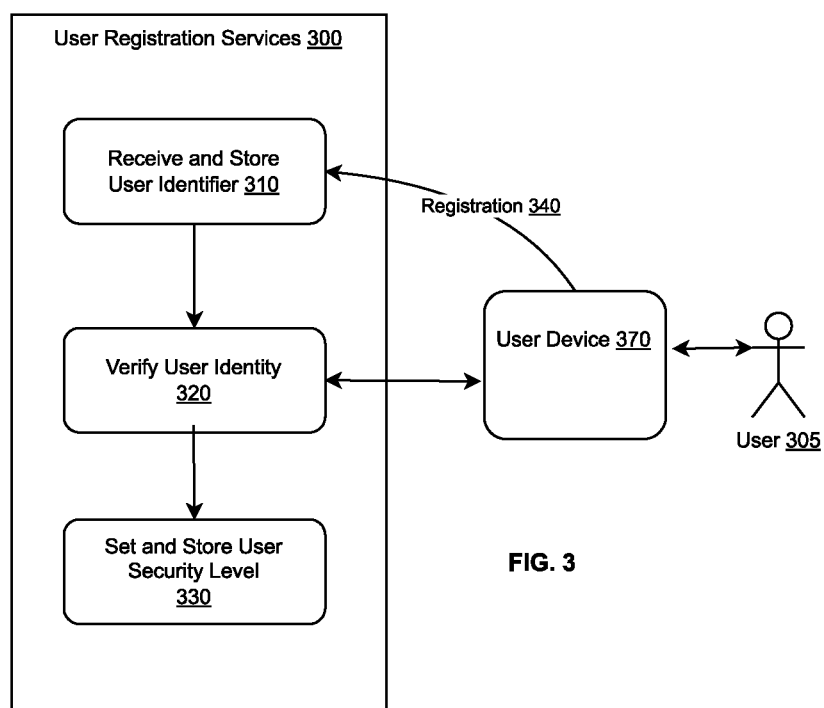
FIG. 3 is a combined flow chart and block diagram illustrating an exemplary embodiment of a method for registering users to enable secure Internet communications, in accordance with the present invention.

FIG. 3 is a combined flow chart and block diagram illustrating an exemplary embodiment of a method for registering users to enable secure Internet communications, in accordance with the present invention.

Referring to FIG. 3, User Registration Service 300 comprises a general process through which a user may be registered on Communications Server 100. User Registration Service 300 may be an instantiation of the User Registration Service 130 Module discussed with respect to FIG. 1. User Registration Service 300 may include the following process steps: Receive and Store User Identifier 310, Verify User Identity 320, and Set and Store User Security Level 330.

The step corresponding to Receive and Store User Identifier 310 may comprise a process in which user identifiers (email addresses and the like) are received via a user registration interaction identified as Registration 340, and are stored within the Database Management System 105 (also DBMS 200). Registration 340 process may occur through a simple web page interface. It may involve a single user such as User 305 providing a single identifier such as an email address. It may also involve a user such as User 305 providing multiple identifiers for multiple users. This step may also establish connection credentials for User 305. User 305 may be an instantiation of User 175 shown in FIG. 1.

The step corresponding to Verify User Identity 320 may comprise a process where a user's identity is verified. A confidence level (i.e., the probability of accuracy) of an identity verification may be tied to a corresponding security level. That is, the higher the confidence of accuracy in a user's identity, the higher the security level that can be granted. The various stages of user identity verification are explained in more detail below. The Verify User Identity 320 process may involve direct interaction with User 305. It may involve User 305 using a device such as User Device 370 to respond to URL links embedded in email. It may involve User 305 relaying codes transmitted by SMS. It may involve User 305 selecting from possible options or responding to questions presented on a web page.

The step corresponding to Set and Store User Security Level 330 may comprise a process where the results of the Verify User Identity 320 process are evaluated and stored as a security level for the user (such as User 305). This security level may result in User 305 being granted or denied certain activities or requests later when the User 305 uses or attempts to use any of various software applications residing and/or executing on User Device 370. For example, the security level may be referenced and used to grant or deny User 305 the ability to purchase certain products.

Public Key Services

Figure 4:
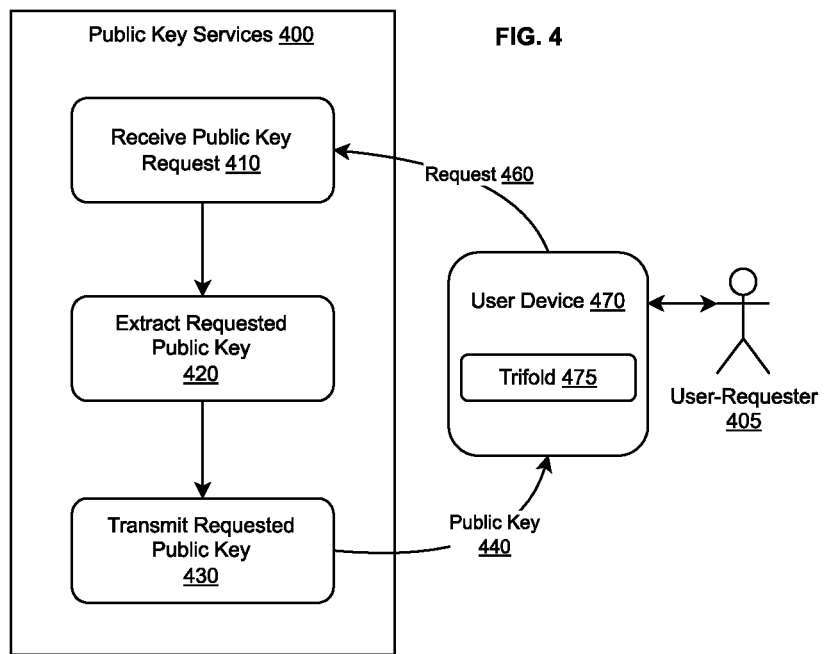
FIG. 4 is a combined flow chart and block diagram illustrating an exemplary embodiment of a method for providing public key services to enable secure Internet communications, in accordance with the present invention.

FIG. 4 is a combined flow chart and block diagram illustrating an exemplary embodiment of a method for providing public key services to enable secure Internet communications, in accordance with the present invention.

Referring to FIG. 4, Public Key Service 400 illustrates the overall process where public keys are provided to users who request them. Such a Request 460 may originate from a remote user device such as User Device 470 controlled by a user such as User-Requester 405. Request 460 may originate from a Trifold 475 executing on User Device 470. Request 460 may originate from some other user-controlled device as well. Also, Trifold 475 may issue Request 460 because it received an upstream request for public keys from an application (not shown) running on User Device 470.

The step corresponding to Receive Public Key Request 410 comprises a listening step in which a Request 460 to provide a public key is received from User Device 470 on behalf of User-Requester 405. Request 460 may request a public key corresponding to a given user and may also be for a particular purpose, for example, to provide the signature verification public key (such as Signature Public Key 224 shown in FIG. 2) for the given user. Request 460 may also indicate a particular purpose for a set of users, for example to provide an encryption key (such as Encryption Public Key 223 shown in FIG. 2)) for User A and User B.

The step corresponding to Extract Requested Public Key Request 420 comprises a process where the defining qualifications that were received in Receive Public Key Request 410 are transformed into query parameters and used to extract the requisite public keys from the DBMS 200 (discussed above in the context of FIG. 2). These parameters may include single or multiple user identifiers and single or multiple purposes.

The step corresponding to Transmit Requested Public Key 430 comprises a process where the Public Key 440 (which may comprise several such public keys) extracted in the previous Extract Requested Public Key Request 420 step is returned to the requesting Trifold 475. Keys such as Public Key 440 are returned in a format consistent with a supported calling protocol known to those skilled in the art.

User Public Private Key Manager

Figure 5:
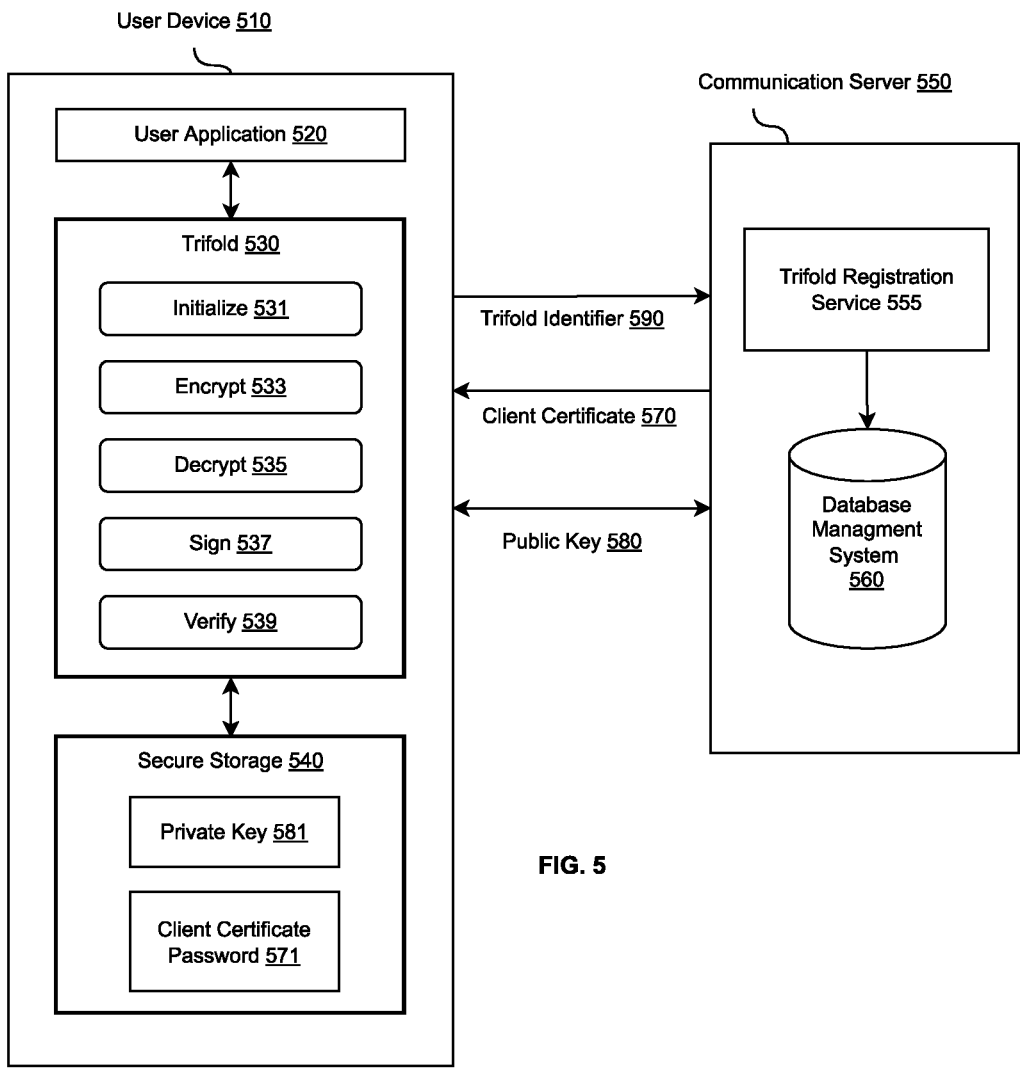
FIG. 5 is a combined flow chart and block diagram illustrating an exemplary embodiment of a public-private key manager (referred to herein as a "Trifold" and defined in greater detail below) for enabling secure Internet communications, in accordance with the present invention.

FIG. 5 is a combined flow chart and block diagram illustrating an exemplary embodiment of a Trifold 530 (a user public-private key manager) for enabling secure Internet communications, in accordance with the present invention.

FIG. 5 also illustrates the Communication Server 550 (discussed previously as Communication Server 100 in FIG. 1), User Device 510 (discussed previously as User Device 170 in FIG. 1), and the Trifold Registration Service 555 (discussed previously as Trifold Registration Service 120).

Referring to FIG. 5, Trifold Registration Service 555 may be responsible for the initial registration and authorization of a Trifold 530 executing on a physically remote User Device 510. Trifold Registration Service 555 may receive a Trifold Identifier 590 that identifies a particular Trifold 530 for a particular User Device 510. The Trifold registration service may accept an industry standard JWT authentication token from an industry standard OAuth server for authentication of this user. This process is familiar to practitioners of the art. Trifold Registration Service 555 may then store Trifold Identifier 590 in the appropriate User Related Records of Database Management System 560 (corresponding to the User Related Records 210 of DBMS 200 in FIG. 2 discussed above). Using common cryptographic libraries familiar to all practitioners, Trifold Registration Service 555 may generate a TLS Client Certificate 570 that will be used by Trifold 530 to identify itself in all future communications with the Communications Server 550. Client Certificate 570 is a commonly used package for password protected private keys. The Certificate itself, which is returned to the Trifold 530, can simply be stored where convenient on the file system of Communication Server 550. The Client Certificate Password 571 for Client Certificate 570 is a secret, and the Trifold 530 should preferably store the corresponding Client Certificate Password 571 within the Secured Storage 540. The public key associated with the private key of the Client Certificate 570 is communicated to the Database Management System 560. It is stored in its own table, relationally tied to the relevant user (not shown), the User Device 510, and the User Application 520 for which the Trifold 530 was registered. The Trifold 530 on User Device 510 may then generate the public/private key pairs that are required. A Public Key 580 may be transmitted to the Communication Server 550 using the Public Key Services 400 (discussed earlier and shown in FIG. 4) for storage in the Database Management System 560. The Private Key 581 of the pair are stored in the Secure Storage 540 on User Device 510.

User Device 510 corresponds to User Device 170, User Device 370, and User Device 470. It may include User Application 520, Trifold 530, and the Secure Storage 540.

User Application 520 may comprise a software application configured to communicate with Trifold 530. Being "configured to communicate with Trifold 530" means User Application 520 may be programmed to invoke the following services of Trifold 530: Encrypt 533, Decrypt 535, Sign 537, and/or Verify 539. It may also have the capability to interact with an industry standard OAuth server and transfer a returned industry standard JWT authentication token to the Trifold.

Trifold 530 comprises a component software module operating on User Device 510 that performs various public-private key management functions, including (a) public-private key generation; (b) public-private key management; and (c) public-private key use. These functions are organized as follows: Initialize 531, Encrypt 533, Decrypt 535, Sign 537, and Verify 539.

The Initialize 531 function comprises initial preparation and configuration functions that should be performed before the Trifold 530 can perform other functions. Initialize 531 automatically executes the first time Trifold 530 is invoked. Initialize 531 calls, via the Internet, the Trifold Registration Service 555 discussed above, which may reside and execute on the Communication Server 550. In response, Trifold Registration Service 555 may provide a Trifold Identifier 590 corresponding to User Device 510 and Client Certificate 570 corresponding to Trifold 530. Initialize 531 receives the Client Certificate 590, which it may use to identify itself for all future communications with the Communications Server 550. Initialize 531 then generates the public-private key pairs for signature and encryption purposes.

Initialize 531 may then transmit Public Key 580 portions of the generated public-private key pairs to the Trifold Registration Service 555 executing on the Communication Server (550) for storage in the Database Management System 560 as discussed above.

For each Public Key 580 generated by the public-private key pair generation process executing within the Initialize 531 function, a corresponding Private Key 581 is generated. Both Private Key 581 and Client Certificate's Password 571 may be securely stored in Secure Storage 540. The exact location and mechanism for securely storing data are different on each supported operating system, but those locations and mechanisms are familiar to those skilled in the art. As the Client Certificate's private key is encrypted, it can simply be stored on the device's file system in a convenient location.

Encrypt 533 is a process that implements the encryption capabilities of the Trifold 530. It is described in detail below with respect to FIG. 9.

Decrypt 535 is a process that implements the decryption capability of the Trifold 530. It is described in detail below with respect to FIG. 10.

Sign 537 is a process that implements the digital signature generation capability of the Trifold 530. It is described in detail below with respect to FIG. 11.

Verify 539 is a process that implements the digital signature verification capability of the Trifold 530. It is described in detail below with respect to FIG. 12.

User Identity Verification Using URLs

Figure 6:
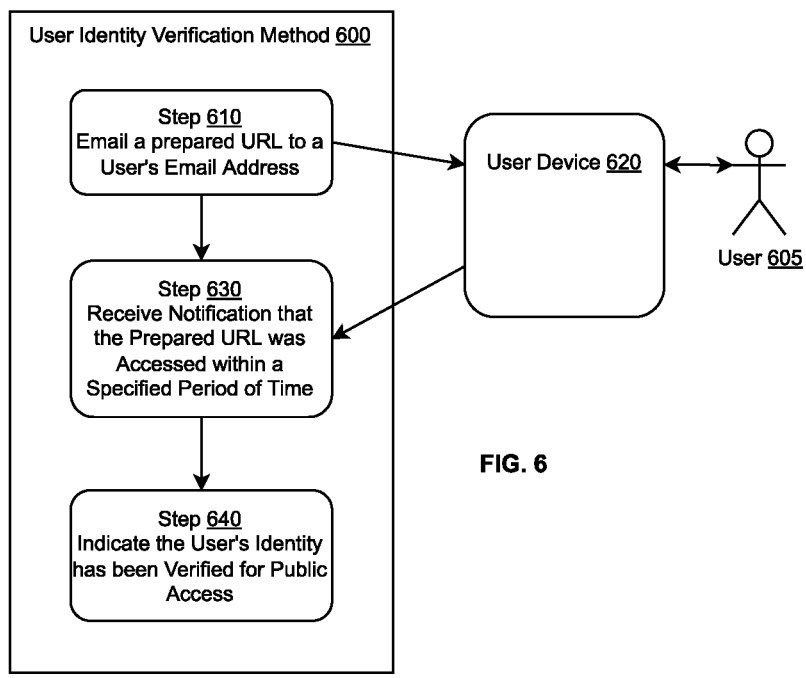
FIG. 6 is a combined flow chart and block diagram illustrating an exemplary embodiment of a method for verifying a user's identity to enable secure Internet communications using a prepared URL, in accordance with the present invention.

FIG. 6 is a combined flow chart and block diagram illustrating an exemplary embodiment of a method for verifying a user's identity to enable secure Internet communications using a prepared URL, in accordance with the present invention.

Referring to FIG. 6, the User Identify Verification Method 600 depicted in FIG. 6 illustrates how a user's email address may be verified by embodiments of the present invention. In Step 610, an email message containing a prepared URL may be sent via an email message to an email address provided by User 605. The email message may instruct User 605 to click on the embedded URL, which, when clicked or selected, will preferably direct User 605 to a prepared web page hosted on a communications server such as Communications Server 100 (see FIG. 1). The URL may additionally contain a prepared token specific to this particular User 605 for this particular purpose at this particular time.

Using User Device 620, User 605 may open the email sent in Step 610 using any industry standard email client. The User 605 may respond by clicking on the URL embedded therein. The clicking action may invoke a web browser displayed on User Device 620 and cause the web browser to open the web page indicated by the URL. When the web page opens, code on the web page may notify software executing on the Communications Server 100 (see FIG. 1) that the Prepared URL was accessed within a specified period of time. At Step 630, upon receiving notice that the user activated the required URL within the specified response time, Step 630 may then invoke Step 640 to record the fact that User 605 has been verified to use the provided email address. Such verification may be manifested by a message transmitted to the user and/or by recording an indication of user identity verification at a corresponding security level within the Database Management System 105 described above with respect to FIG. 1 and/or DBMS 200 described above with respect to FIG. 2.

User Identity Verification Using SMS Messages

Figure 7:
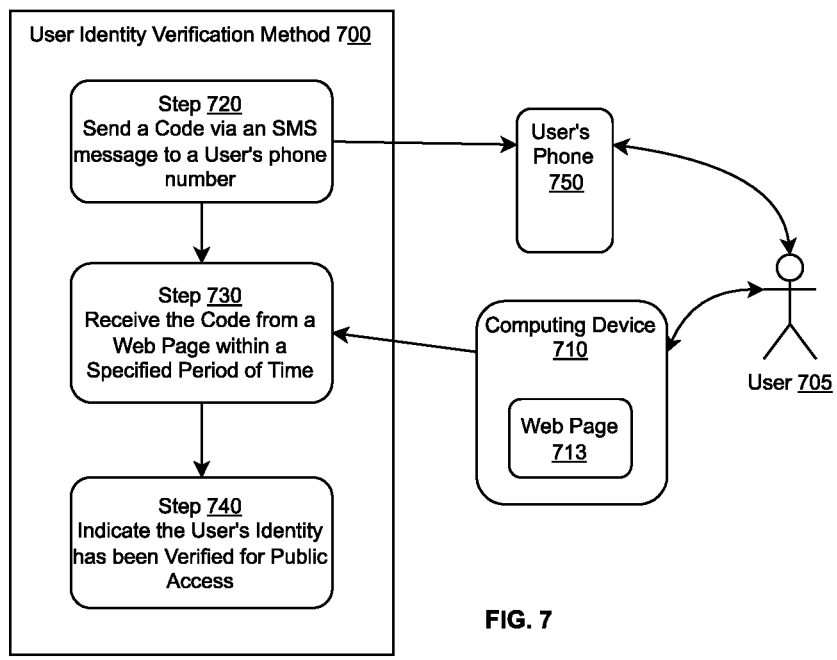
FIG. 7 is a combined flow chart and block diagram illustrating an exemplary embodiment of a method for verifying a user's identity to enable secure Internet communications using an SMS message delivered to a user's cellphone, in accordance with the present invention.

FIG. 7 is a combined flow chart and block diagram illustrating an exemplary embodiment of a method for verifying a user's identity to enable secure Internet communications using an SMS message delivered to a user's cellphone, in accordance with the present invention.

Referring to FIG. 7, the User Identify Verification Method 700 depicted in FIG. 7 illustrates how a user's phone number may be verified by embodiments of the present invention. This may be necessary or desired if, for example, two-factor authentication is required for a user account.

At Step 720, a Code may be sent to User 705 via an SMS message to a User's Phone 750 via a phone number that User 705 provided as a User Identifier 222 (see FIG. 2 described above). The Code and SMS message may be prepared and sent using any industry standard mechanism or service known to those skilled in the art.

When the transmitted SMS code is received by User 705 on the User's Phone 750 via the user's phone number, the User 705 may enter the received code using an interface provided on a Web Page 713 accessed via Computing Device 710. Computing Device 710 may be identical to the User's Phone 750 or it may be a separate computing device. When the User 705 enters the received SMS code into Web Page 713 within a specified period of time, Step 730 may receive the SMS code compare it to the one that was sent. If there is a match, Step 730 may then invoke Step 740 to record the fact that the identity of User 605 has been verified. Such verification may be manifested by a message transmitted to the user and/or by recording an indication of user identity verification at a corresponding security level within the Database Management System 105 described above with respect to FIG. 1 and/or DBMS 200 described above with respect to FIG. 2

User Identity Verification Using a Trusted Name Address Source

Figure 8:
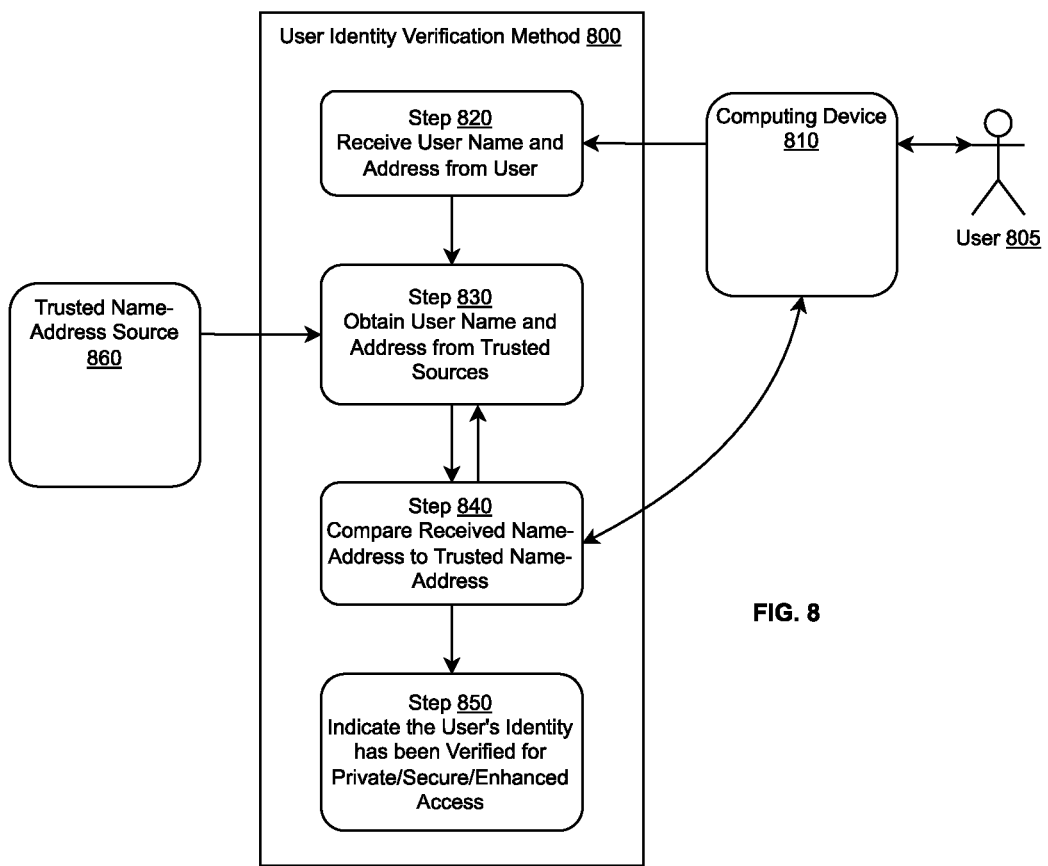
FIG. 8 is a combined flow chart and block diagram illustrating an exemplary embodiment of a method for verifying a user's identity to enable secure Internet communications using a trusted name-address source, in accordance with the present invention.

FIG. 8 is a combined flow chart and block diagram illustrating an exemplary embodiment of a method for verifying a user's identity to enable secure Internet communications using a trusted name-address source, in accordance with the present invention.

Referring to FIG. 8, the User Identify Verification Method 800 depicted in FIG. 8 illustrates how trusted third-party sources may be used to verify the identity of a user such as User 805. Such third-party sources may be used to verifiably link the real name and physical address of User 805 with electronic User Identifiers 222 (see FIG. 2, examples of which are an email address and a phone number) that have been verified as described above. Third-Party verification may be used to establish higher security levels.

User 805 may use Computing Device 810 to create an account on the Communications Server 100 shown in FIG. 1. During the account-creation process, User 805 may provide user name and address information at Step 820. The user name and address information may be saved in User Verification Info 221 of DBMS 200 (see FIG. 2) described above.

At Step 830, the User Identity Verification Method 800 may then obtain User Name and Addresses information from a Trusted Name-Address Source 860. This Step 830 may involve accessing more than one Trusted Name-Address Source 860. For example, Step 830 may include reading a trusted government document such as a driver's license or state identity card. It may involve communicating with trusted data services such as Ekata (see https://ekata.com/). These sources may be contacted in an iterative or sequential fashion, depending on the results obtained from the next Step 840 and the specific security level being sought by User 805.

At Step 840, the User Identity Verification Method 800 may compare user name and address information received from User 805 with corresponding User Name and Addresses information received from a Trusted Name-Address Source 860. If there is a substantive match, User 805 may be accepted for subsequent communications at an increased security level at Step 850.

If there is not an adequate substantive match between user name and address information received from User 805 and corresponding User Name and Addresses information received from a Trusted Name-Address Source 860, then Step 830 may be repeated using a different Trusted Name-Address Source 860. Or User 805 may be denied for subsequent communications at an increased security level at Step 850.

Because these trusted sources such as Trusted Name-Address Source 860 are neither authoritative nor authoritatively verifiable (there is no authoritative central registry for persons, email, or cell phone in the United States and the ability for non-law-enforcement personnel to verify a driver's license or passport with the issuing authority is severely restricted) mechanisms for coping with partial matches, for example, where only one of the Received User Name or Received Address matches the Trusted User Name and Trusted Address, are implemented. These coping mechanisms may consist of requiring the User 805 to select from a list of possible addresses or possible names where one member in the list contains the actual Trusted Name or Trusted Address. The coping mechanisms may also consist of geo-location testing of the User 805 and User Device 810 against the Trusted Provider Address.

Successful completion (i.e., substantive matching) of the comparison of Received Name-Address to Trusted Name-Address at Step 840 may result in the User's Identity being Verified for higher security level at Step 850. This may result in a message sent to the user. It may result in storing security level information in User Verification Info 221 of DBMS 200 (see FIG. 2) described above.

Encrypt

Figure 9:
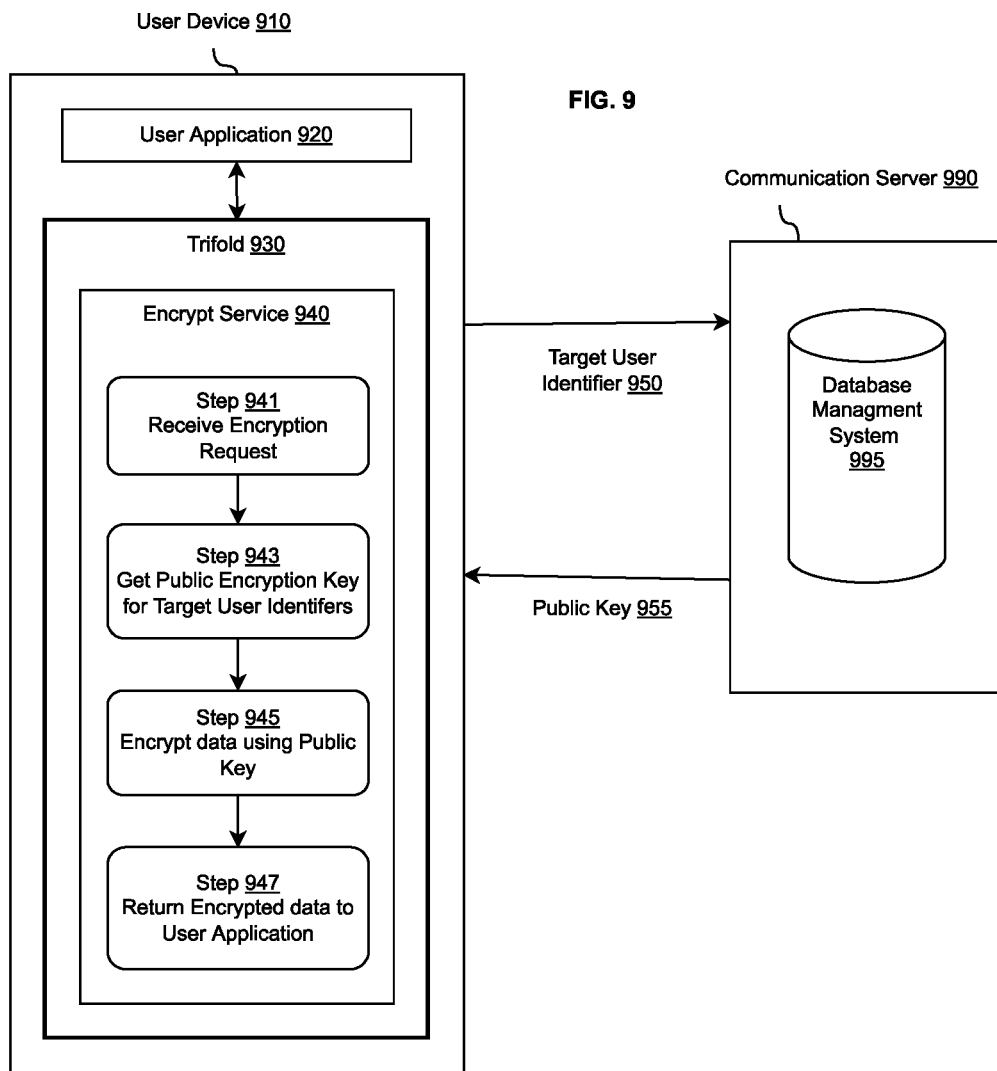
FIG. 9 is a combined flow chart and block diagram illustrating an exemplary embodiment of a method for encrypting user data, in accordance with the present invention.

FIG. 9 is a combined flow chart and block diagram illustrating an exemplary embodiment of a method for encrypting user data, in accordance with the present invention.

FIG. 9 also illustrates the Communication Server 990 (discussed previously as Communication Server 100 in FIG. 1), User Device 910 (discussed previously as User Device 170 in FIG. 1), and the Database Management System 995 (discussed previously as Database Management System 105 in FIG. 1).

Referring to FIG. 9, User Device 910 may correspond to User Device 170 and/or other similar User Devices disclosed and described herein. It may include User Application 920, and Trifold 930.

User Application 920 may comprise a software application configured to communicate with Trifold 930 to invoke the Encryption Service 940 of Trifold 930.

Trifold 930 may correspond to Trifold 173 and/or other similar Trifolds disclosed and described herein.

Encryption Service 940 may begin at Step 941 when User Application 920 communicates with Trifold 930 to invoke Encryption Service 940. When Encryption Service 940 is invoked, User Application 920 may provide Trifold 930 the data to encrypt and any Target User Identifier 950 for whom encryption is to be performed. The data to encrypt may be represented as a raw byte array. The Target User Identifier 950 may comprise an email addresses or the like.

At Step 943, Encryption Service 940 may send the Target User Identifier 950 to the Communications Server 990 along with a request to return a Public Key 955 associated with that Target User Identifier 950. When Communication Server 990 provides the Public Key 955, Step 945 may then begin.

At Step 945, Encryption Service 940 may encrypt the data provided by User Application 920 using any one of many industry standard cryptographic encryption functions known by those skilled in the art, using Public Key 955. The encrypted data may be represented as an array of bytes.

At Step 947, the encrypted data may be returned to User Application 920.

Decrypt

Figure 10:
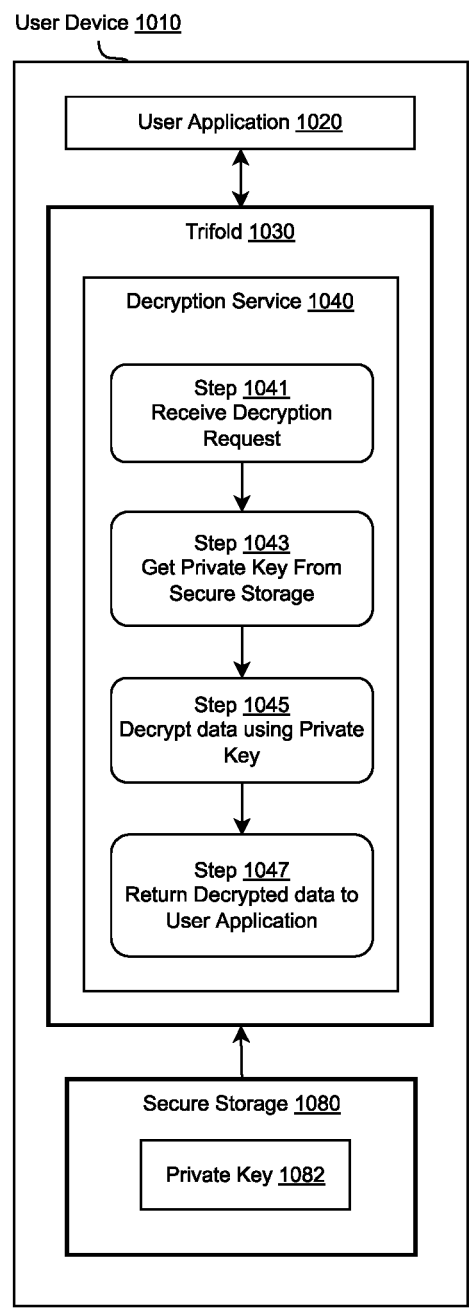
FIG. 10 is a combined flow chart and block diagram illustrating an exemplary embodiment of a method for decrypting user data, in accordance with the present invention.

FIG. 10 is a combined flow chart and block diagram illustrating an exemplary embodiment of a method for decrypting user data, in accordance with the present invention.

Referring to FIG. 10, User Device 1010 may correspond to User Device 170 and/or other similar User Devices disclosed and described herein. It may include User Application 1020, Trifold 1030, and the Secure Storage 1080.

User Application 1020 may comprise a software application configured to communicate with Trifold 1030 to invoke the Decryption Service 1040 of Trifold 1030.

Trifold 1030 may correspond to Trifold 173 and/or other similar Trifolds disclosed and described herein.

Secure Storage 1080 may correspond to Secure Storage 540 and/or other similar Secure Storage areas disclosed and described herein.

Decryption Service 1040 may begin at Step 1041 when User Application 1020 communicates with Trifold 1030 to invoke Decryption Service 1040 by sending a Decryption Request. When Decryption Service 1040 receives the Decryption Request, User Application 1020 may provide Trifold 1030 the data to decrypt. The data to encrypt may be represented as a raw byte array.

At Step 1043, Decryption Service 1040 may retrieve Private Key 1082 from Secure Storage 1080. Private Key 1082 was created by Trifold 1030 at Step 531 (Initialize) for the purpose of decrypting data that has been encrypted with a corresponding public key such as Public Key 580 discussed in the context of FIG. 5.

At Step 1045, Decryption Service 1040 may decrypt the provided data using Private Key 1082 using any one of many industry standard cryptographic decryption functions known by those skilled in the art.

At Step 1047, Decryption Service 1040 may return the decrypted data to User Application 1020.

Sign

Figure 11:
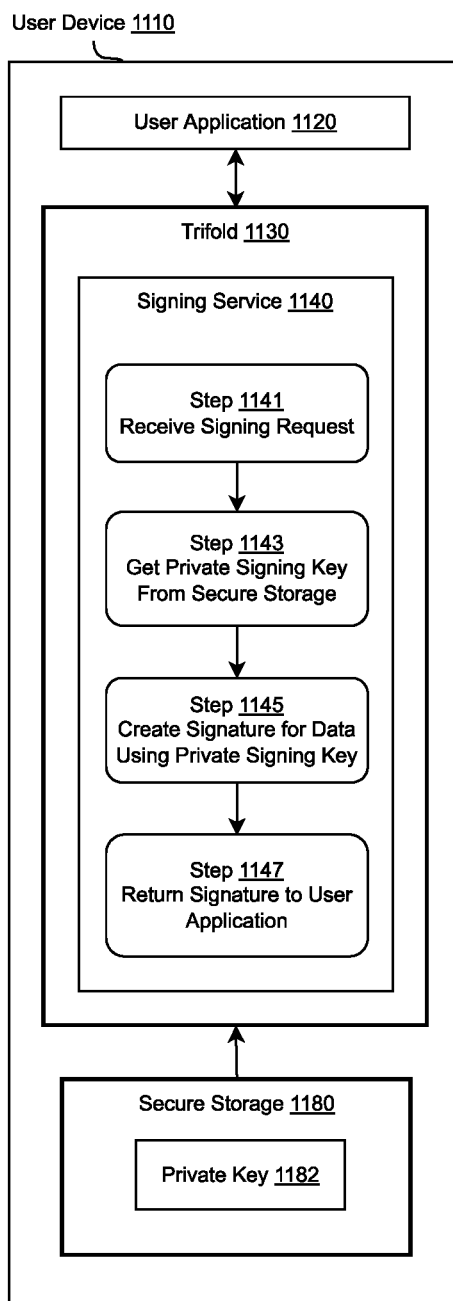
FIG. 11 is a combined flow chart and block diagram illustrating an exemplary embodiment of a method for cryptographically signing a digital document, in accordance with the present invention.

FIG. 11 is a combined flow chart and block diagram illustrating an exemplary embodiment of a method for cryptographically signing a digital document, in accordance with the present invention.

Referring to FIG. 11, User Device 1110 may correspond to User Device 170 and/or other similar User Devices disclosed and described herein. It may include User Application 1120, Trifold 1130, and the Secure Storage 1180.

User Application 1120 may comprise a software application configured to communicate with Trifold 1130 to invoke the Signing Service 1140 of Trifold 1130.

Trifold 1130 may correspond to Trifold 173 and/or other similar Trifolds disclosed and described herein.

Secure Storage 1180 may correspond to Secure Storage 540 and/or other similar Secure Storage areas disclosed and described herein.

Signing Service 1140 may begin at Step 1141 when User Application 1120 communicates with Trifold 1130 to invoke Signing Service 1140 by sending a Signing Request. When Signing Service 1140 receives the Signing Request, User Application 1120 may provide Trifold 1130 the data or digital document to sign. The data or document to sign may be represented as a raw byte array.

At Step 1143, Signing Service 1140 may retrieve Private Key 1182 from Secure Storage 1180. Private Key 1182 was created by Trifold 1030 at Step 531 (Initialize) for the purpose of signing digital data, where the resulting signature can be verified with a corresponding public key such as Public Key 580 discussed in the context of FIG. 5.

At Step 1145, Signing Service 1140 may sign the provided data using Private Key 1182 to create a digital signature using any one of many industry standard cryptographic signing functions known by those skilled in the art.

At Step 1147, Signing Service 1140 may return the digital signature to User Application 1120.

Verify

Figure 12:
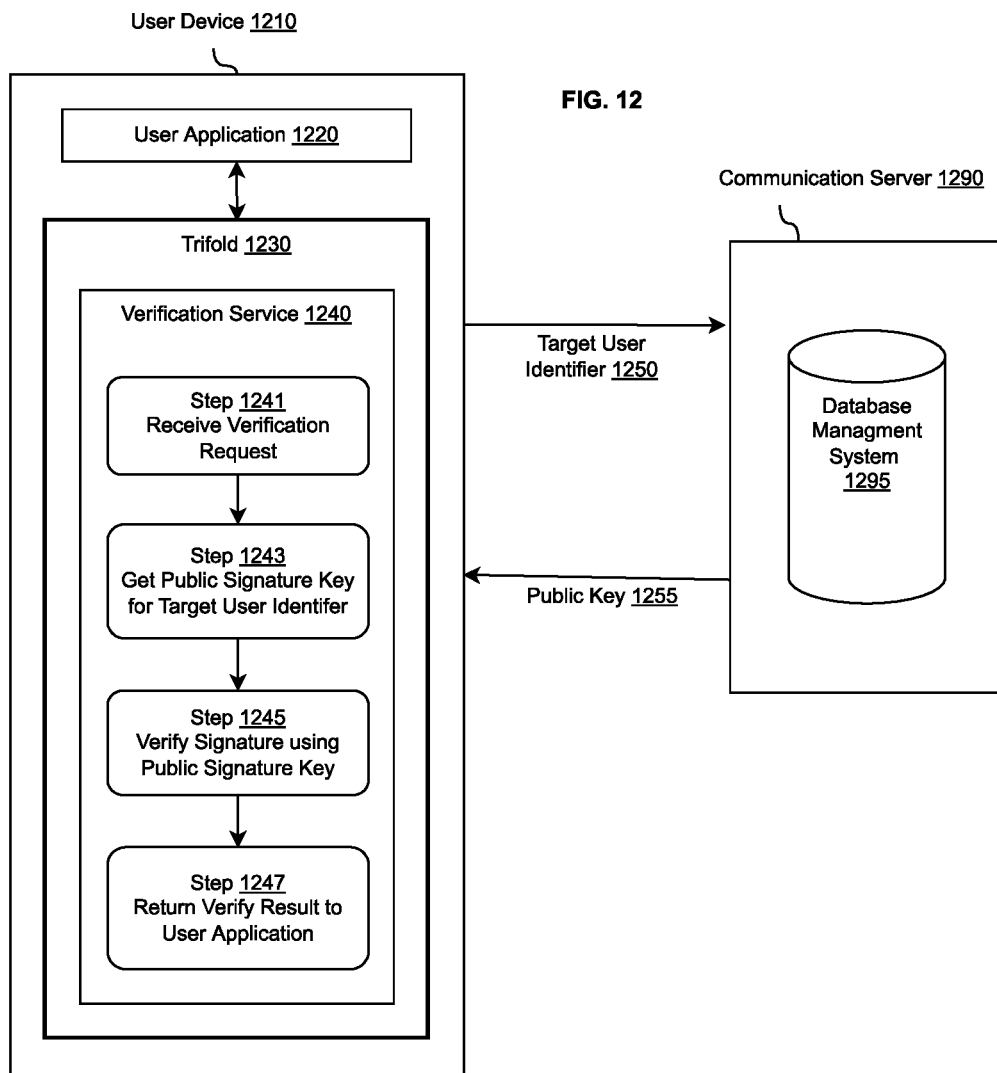
FIG. 12 is a combined flow chart and block diagram illustrating an exemplary embodiment of a method for verifying a digital signature, in accordance with the present invention.

FIG. 12 is a combined flow chart and block diagram illustrating an exemplary embodiment of a method for verifying a digital signature, in accordance with the present invention.

FIG. 12 also illustrates the Communication Server 1290 (discussed previously as Communication Server 100 in FIG. 1), User Device 1210 (discussed previously as User Device 170 in FIG. 1), and the Database Management System 1295 (discussed previously as Database Management System 105 in FIG. 1).

Referring to FIG. 12, User Device 1210 may correspond to User Device 170 and/or other similar User Devices disclosed and described herein. It may include User Application 1220, and Trifold 1230.

User Application 1220 may comprise a software application configured to communicate with Trifold 1230 to invoke the Verification Service 1240 of Trifold 1230.

Trifold 1230 may correspond to Trifold 173 and other similar Trifolds disclosed and described herein.

Verification Service 1240 may begin at Step 1241 when User Application 1220 communicates with Trifold 1230 to invoke Verification Service 1240. When Verification Service 1240 is invoked and receives a Verification Request, User Application 1220 may provide Trifold 1230 the data to verify and a Target User Identifier 1250 for whom verification is to be performed. The data to encrypt may be represented as a raw byte array. The Target User Identifier 1250 may comprise an email addresses or the like. The Verification Request received at Step 1241 from User Application 1220 may include a digital signature, data that was signed, and a User Identifier of the purported signer. Both the digital signature and the signed data may be represented as arrays of bytes.

At Step 1243, Verification Service 1240 may send the Target User Identifier 1250 to the Communications Server 1290 along with a request to return a Public Key 1255 associated with that Target User Identifier 1250. When Communication Server 1290 provides the Public Key 1255, Step 1245 may then begin.

At Step 1245, Public Key 1255 may be combined with the digital signature and the data that was signed. Industry standard cryptographic signature verification functions may then be used to prove that the signature either was created (verified) or was not created (not verified) using the private key associated with this Public Key 1255.

At Step 1247, the verification result may be returned to User Application 1220.

Benefits and Advantages of the Embodiments

This invention brings the power of digital signature signing and verification for purposes of authentication and non-repudiation and encryption-decryption for enhanced security within reach of ordinary users. They can realize these capabilities without having to navigate the signing requests of certificate authorities, or determine how to install certificates onto a variety of different physical devices. These users are never obliged to share their private keys with other servers where they are vulnerable to a targeted attack, nor are they required to entrust confidential documents to security promised on a third party server. Their data and their security keys are always under control of software running on their personnel devices.

These capabilities are available to any application that is secured by the techniques disclosed by embodiments of the present invention and are therefore "TripleEnabled" and can take advantage of the capabilities.

Users of embodiments of the present invention also gain a much higher degree of certainty with respect to whom they are communicating on the Internet. This occurs in several dimensions. Most simply they are getting a digitally signed email from a particular address that can be easily traced to an owner. Embodiments can dramatically reduce the address spoofing that is often used in phishing attacks. On a more sophisticated level, secured communications such as are enabled by embodiments of the present invention can be tied back to a real, verified physical identity. A message received from email address user_name@domain.com will thereby not only be known to have come from that email address, but it can be easily known that the person behind the email address has been verified to be a certain person living at a specific address. Reported misuse of this credential can easily be traced and the keys used for it can be invalidated.

Computing Device

Figure 13:
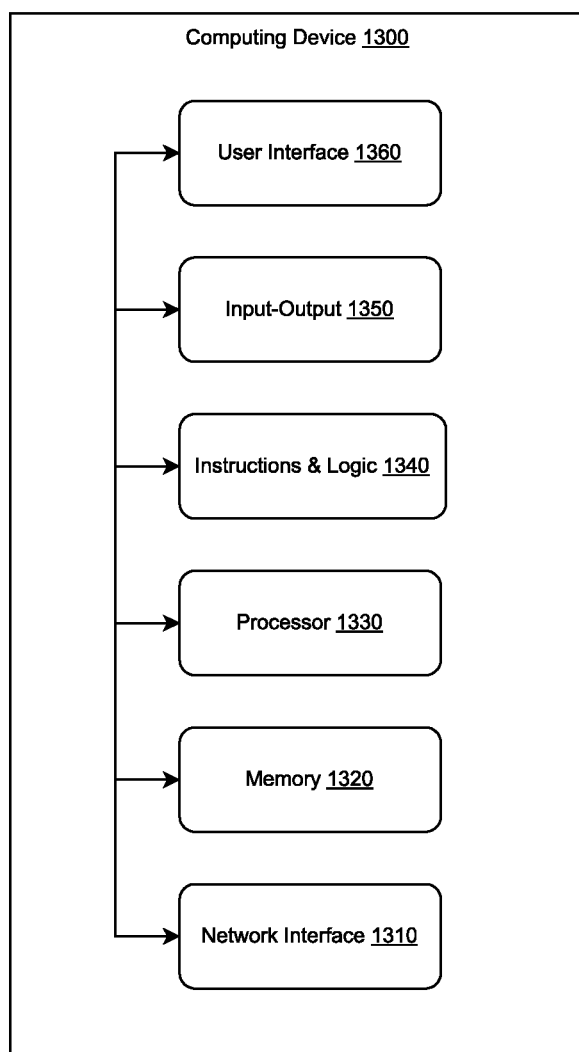
FIG. 13 is a block diagram of an exemplary embodiment of a computing device, in accordance with the present invention.

FIG. 13 is a block diagram of an exemplary embodiment of a Computing Device 1300, in accordance with the present invention, which in certain operative embodiments can comprise, for example, the Computing Server 100, the User Device 170, Requester Device 180, User Device 370, User Device 470, User Device 510, Communication Server 550, User Device 620, User's Phone 750, Computing Device 710, Computing Device 810, User Device 910, Communications Server 990, User Device 1010, User Device 1110, User Device 1210, and Communications Server 1290. Computing Device 1300 may comprise any of numerous components, such as for example, one or more Network Interfaces 1310, one or more Memories 1320, one or more Processors 1330, program Instructions and Logic 1340, one or more Input/Output ("I/O") Devices 1350, and one or more User Interfaces 1360 that may be coupled to the I/O Device(s) 1350, etc.

Computing Device 1300 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 1300. Such a Computing Device 1300 can comprise components such as one or more Network Interfaces 1310, one or more Processors 1330, one or more Memories 1320 containing Instructions and Logic 1340, one or more Input/Output (I/O) Devices 1350, and one or more User Interfaces 1360 coupled to the I/O Devices 1350, etc.

Memory 1320 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/Output (I/O) Device 1350 may comprise any sensory-oriented input and/or output device known in the art, such as an audio, visual, and/or haptic device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 200.

Instructions and Logic 1340 may comprise directions adapted to cause a machine, such as Computing Device 200, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 1340 may reside in Processor 1330 and/or Memory 1320.

Network Interface 1310 may comprise any device, system, or subsystem capable of coupling an information device to a network. For example, Network Interface 1310 can comprise a telephone, cellular phone, cellular modem, telephone data modem, fax modem, wireless transceiver, Ethernet circuit, cable modem, digital subscriber line interface, bridge, hub, router, switch, or other similar device.

Processor 1330 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can comprise a general-purpose device, such as a microcontroller and/or a microprocessor, such the Pentium IV series of microprocessors manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

User Interface 1360 may comprise any device and/or means for rendering information to a user and/or requesting information from the user. User Interface 1360 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or another visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Variations

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Although the present disclosure provides certain embodiments and applications, other embodiments apparent to those of ordinary skill in the art, including embodiments that do not provide all of the features and advantages set forth herein, are also within the scope of this disclosure.

The present invention, as already noted, can be embedded in a computer program product, such as a computer-readable storage medium or device which when loaded into a computer system is able to carry out the different methods described herein. A "computer program," in the present context, means any expression, in any computing language, code or notation, of a set of instructions intended to cause a system having an information processing capability to perform a particular set of functions, either directly or indirectly, including after either or both of the following: a) conversion to another language, code or notation; or b) reproduction, including reproduction in a different material form.

The foregoing disclosure has been set forth merely to illustrate the invention and is not intended to be limiting. It will be appreciated that modifications, variations, and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A method for facilitating secure communications via the Internet, comprising:
   registering a plurality of users in a database management system (DBMS) residing on a centrally controlled computing server accessible via the Internet, said registering step comprising for each such user:
   (a) receiving, from the user, a public key generated by a computing device controlled by the user,
   (b) receiving, from the user, a user email address associated with the user,
   (c) receiving, from the user, a user name associated with the user and a user address associated with the user,
   (d) obtaining, from a trusted external name-address information source, a trusted user name and a trusted user address for the user,
   (e) comparing the user name to the trusted user name,
   (f) comparing the user address to the trusted user address,
   (g) verifying the user email address by emailing a prepared Universal Resource Locator (URL) to the user email address; and receiving a notification that the prepared URL was accessed within a specified period of time,
   (h) validating the user for secure communications if the user name matches the trusted user name and the user address matches the trusted user address, and
   (i) storing, in a user entry in the DBMS, the user email address, the public key, and a result of the secure communications validation;
   receiving, from a requester via the Internet, a request related to a requested user identifier, where the requested user identifier is associated with a user other than the requester;
   in response to the request:
   (1) searching the DBMS for a matching user entry containing the requested user identifier,
   (2) extracting, from the matching user entry, the public key,
   (3) extracting, from the matching user entry, the result of the secure communications validation, and
   (3) transmitting the extracted public key and the extracted result of the secure communications validation to the requester;
   exporting portions of the DBMS to a cryptographic chain comprising a plurality of chained records, each chained record comprising data extracted from one of the user entries in the DBMS;
   transmitting a copy of the cryptographic chain to an immutable, append-only blob storage via a secure connection; and
   providing public access to the transmitted cryptographic chain in the blob storage.

* * * * *